(12) United States Patent
Wentzloff et al.

(10) Patent No.: US 10,667,214 B2
(45) Date of Patent: May 26, 2020

(54) METHODS AND APPARATUS FOR WIRELESS COMMUNICATION VIA A PREDEFINED SEQUENCE OF A CHANGE OF A CHARACTERISTIC OF A WIRELESS SIGNAL

(71) Applicant: PsiKick, Inc., Charlottesville, VA (US)

(72) Inventors: David D. Wentzloff, Ann Arbor, MI (US); Benton H. Calhoun, Charlottesville, VA (US)

(73) Assignee: EVERACTIVE INC., Ann Arbor, MI (US)

( * ) Notice: Subject to any disclaimer, the term of this patent is extended or adjusted under 35 U.S.C. 154(b) by 0 days.

(21) Appl. No.: 14/213,771

(22) Filed: Mar. 14, 2014

(65) Prior Publication Data
US 2014/0269563 A1   Sep. 18, 2014

Related U.S. Application Data

(60) Provisional application No. 61/782,220, filed on Mar. 14, 2013.

(51) Int. Cl.
*H04B 7/26* (2006.01)
*H04W 52/02* (2009.01)
*H04W 52/26* (2009.01)

(52) U.S. Cl.
CPC ... *H04W 52/0229* (2013.01); *H04W 52/0216* (2013.01); *H04W 52/262* (2013.01); *Y02D 70/1262* (2018.01); *Y02D 70/142* (2018.01); *Y02D 70/144* (2018.01); *Y02D 70/164* (2018.01); *Y02D 70/166* (2018.01)

(58) Field of Classification Search
None
See application file for complete search history.

(56) References Cited

U.S. PATENT DOCUMENTS

| | | | |
|---|---|---|---|
| 6,343,185 | B1 | 8/2002 | Struhsaker |
| 6,434,185 | B1 | 8/2002 | Struhsaker |

(Continued)

OTHER PUBLICATIONS

PCT US2014/028889 (Mar. 14, 2014 International Filing Date) International Preliminary Report on Patentability (dated Sep. 24, 2015).

(Continued)

*Primary Examiner* — Anh Vu H Ly
*Assistant Examiner* — Hector Reyes
(74) *Attorney, Agent, or Firm* — Martensen IP

(57) ABSTRACT

In some embodiments, an apparatus includes a wireless receiver circuit that can receive a wireless signal from a wireless communication device that is (1) separate from the wireless receiver circuit and (2) can encode a first information according to a protocol. The wireless receiver circuit can detect a predefined sequence of changes of a characteristic within the wireless signal to decode, from the wireless signal, a second information mutually exclusive from the first information without decoding the first information. In such embodiments, the wireless receiver circuit can send the second information.

15 Claims, 9 Drawing Sheets

(56) References Cited

U.S. PATENT DOCUMENTS

| | | |
|---|---|---|
| 6,535,724 B1 | 3/2003 | Pernici et al. |
| 6,646,604 B2 | 11/2003 | Anderson |
| 6,853,835 B2 | 2/2005 | Wynbeek |
| 6,867,696 B2 | 3/2005 | Becken |
| 7,283,475 B2 | 10/2007 | Fortin et al. |
| 7,362,781 B2 | 4/2008 | Rhoads |
| 7,415,018 B2 | 8/2008 | Jones et al. |
| 7,571,269 B2 | 8/2009 | Schmidt et al. |
| 7,693,191 B2 | 4/2010 | Gorday |
| 7,715,446 B2 | 5/2010 | Rhoads |
| 7,813,344 B2 | 10/2010 | Cheswick |
| 8,027,663 B2 | 9/2011 | Rhoads |
| 8,081,944 B2 | 12/2011 | Shaolin |
| 8,325,704 B1 | 12/2012 | Lemkin et al. |
| 8,848,777 B2 | 9/2014 | Wang |
| 9,477,292 B1* | 10/2016 | Murali ............... G06F 1/3243 |
| 2003/0040326 A1 | 2/2003 | Levy et al. |
| 2003/0076782 A1 | 4/2003 | Fortin |
| 2003/0084148 A1 | 5/2003 | Cousins |
| 2003/0091064 A1* | 5/2003 | Partridge ............ H04L 12/58 370/465 |
| 2003/0097439 A1 | 5/2003 | Strayer |
| 2003/0203740 A1 | 10/2003 | Bahl |
| 2004/0059935 A1 | 3/2004 | Cousins |
| 2005/0054319 A1 | 3/2005 | Tamaki |
| 2005/0169201 A1 | 8/2005 | Huyiebroeck |
| 2005/0186906 A1 | 8/2005 | Hussmann |
| 2007/0082647 A1 | 4/2007 | Behzad |
| 2007/0082715 A1* | 4/2007 | Rofougaran ......... H04W 48/08 455/574 |
| 2008/0046549 A1 | 2/2008 | Saxena |
| 2008/0240167 A1 | 10/2008 | Keaney |
| 2009/0047991 A1 | 2/2009 | Elg |
| 2010/0003935 A1 | 1/2010 | Behzad |
| 2010/0067546 A1 | 3/2010 | Mishra |
| 2010/0079254 A1 | 4/2010 | Koo et al. |
| 2010/0105346 A1 | 4/2010 | Huang |
| 2010/0120362 A1 | 5/2010 | Walley et al. |
| 2010/0202767 A1 | 12/2010 | Shirakawa et al. |
| 2011/0317600 A1 | 12/2011 | Thomson et al. |
| 2013/0039239 A1 | 2/2013 | Lin |
| 2013/0040573 A1 | 2/2013 | Hillyard |
| 2013/0322313 A1 | 12/2013 | Sikri |
| 2013/0336188 A1 | 12/2013 | Yomo |
| 2014/0126442 A1* | 5/2014 | Jafarian ............ H04W 52/0212 370/311 |
| 2014/0146756 A1 | 5/2014 | Sahin |
| 2015/0036575 A1 | 2/2015 | Li |

OTHER PUBLICATIONS

Bo Yuan and Peter Lutz, A Covert Channel in Packet Switching Data Networks, Rochester Institute of Technology, Rochester, New York.

Sebastian Zander and Grenville Armitage, and Philip Branch, A Survey of Covert Channels and Countermeasures in Computer Network Protocols, 3rd Quarter 2007, vol. 9, No. 3, IEE Communications Survey, Swinburne University of Technology Melbourne, Australia.

Telvis E. Calhoun Jr, Xiaojun Cao, Yingshu Li and Raheem Beyah, An 802.11 MAC layer covert channel, Wirel. Commun. Mob. Comput. (2010), Published online in Wiley InterScience (www.interscience.wiley.com). DOI: 10.1002/wcm.969, Department of Computer Science, Georgia State University, Atlanta, GA 30303, U.S.A.

Derek Dye, Bandwidth and detection of packet length covert channels, Issue Date Mar. 2011, Monterey, California. Naval Postgraduate School, http://hdl.handle.net/10945/5724.

Björn Stelte, Thomas Bühring, Concealed Integrity Monitoring for Wireless Sensor Networks, Wireless Sensor Network, 2011, 3, 10-17, doi:10.4236/wsn.2011.31002 Published Online Jan. 2011 (http://www.SciRP.org/journal/wsn).

Jonathan Edwards, Covert Channels in Ad Hoc Networking: An Analysis using the Optimized Link State Routing Protocol, A thesis submitted to the Faculty of Graduate and Postdoctoral Affairs in partial fulfillment of the requirements for the degree of Master of Applied Science in Electrical and Computer Engineering, Carleton University, Ontario, Canada, Apr. 2012.

Norka B. Lucena, Grzegorz Lewandowski, and Steve J. Chapin, Covert Channels in IPv6, Syracuse University, Syracuse NY 13244, USA.

Manfred Wolf, Covert Channeles in LAN Protocols, Tele-Consulting GMBH, Germany.

Gary Girling, Covert Channels in LAN's, IEEE Transactions on Software Engineering, vol. SE-13, No. 2, Feb. 1987.

Boris Panajotov and Aleksandra Mileva, Covert Channels in TCP/IP Protocol Stack, ICT Innovations 2013 Web Proceedings ISSN 1857-7288, University \Goce Delcev", Faculty of Computer Science, \Krste Misirkov" bb, 2000, Stip, Republic of Macedonia.

Vincent Berk, Annarita Giani, George Cybenko, Detection of Covert Channel Encoding in Network Packet Delays, Technical Report TR2005536, Department of Computer Science, Dartmouth College, Hanover, NH, Aug. 2005.

Theodore Handel and Maxwell T. Sandford II, Hiding Data in the OSI Network Model, Weapon Design Technology Group, Los Alamos National Laboratory, Los Alamos, NM 87545.

M.A. Padlipsky, D.W. Snow, and P.A. Karger, Limitations of End-to-End Encryption in Secure Computer Networks, Deputy for Technical Operations, Electronic Systems Division, Air Force Systems Command, Hanscom Air Force Base, Massachusetts.

Carlos Scott, Network Covert Channels: Review of Current State and Analysis of Viability of the use of X.509, Technical Report RHUL-MA-2008-11, Royal Holloway Univeristy of London, Jan. 15, 2008 http://www.rhul.ac.uk/mathematics/techreports.

Christian Kratzer, Jana Dittmann, Andreas Lang, Tobias Kuhne, WLAN Steganography: A First Practical Review, Dept. of Computer Science, Research Group Multimedia and Security, Otto-von-Guericke-University of Magdeburg, Germany.

Liping Ji, Wenhao Jiang, Benyang Dai, Xiamu Niu, A Novel Covert Channel Based on Length of Messages, 2009 International Symposium on Information Engineering and Electronic Commerce, Harbin Institute of Technology Shenzhen Graduate School Shenzhen, P. R. China.

Xinyu Zhang, Kang G. Shin, Gap Sense: Lightweight Coordination of Heterogeneous Wireless Devices.

Sebastian Zander, Performance of Selected Noisy Covert Channels and Their Countermeasures in IP Networks, Thesis submitted in accordance with the requirements for the degree of Doctor of Philosophy, Centre for Advanced Internet Architectures, Faculty of Information and Communication Technologies, Swinburne University of Technology, Melbourne, Australia, May 2010.

Selected PTO Documents from 2003/0091064.

International Search Report for Corresponding PCT/US2014/28889 application.

Kondo et al., Wake-up radio using IEEE 802.11 frame length modulation for radio-on-demand wireless LAN, IEEE 22nd International Symposium on personal, indoor and mobile radio communications.

Selected USPTO Documents from 2003/0091064.

Berk, Vincent, et al., "Detection of Covert Channel Encoding in Network Packet Delays," Technical Report TR2005-536, Department of Computer Sciences, Dartmouth College, Hanover, NH, Aug. 2005.

Calhoun, Telvis E., et al., "An 802.11 MAC Layer Covert Channel," Wireless Communications and Mobile Computing (2010), Wiley InterScience www.interscience.wiley.com; DOI: 10.1002/wcm.969, Department of Computer Sciences, Georgia State University, Atlanta, GA 30303, USA.

Dye, Derek, "Bandwidth and detection of packet length cover channels," Issue date Mar. 2011, Monterey, California, Naval Postgraduate School, http://hdl.handle.net/10945/5724.

Edwards, Jonathan, "Covert Channels in Ad Hoc Networking: An Analysis Using the Optimized Link State Routing Protocol," A thesis submitted to the Faculty of Graduate and Postdoctoral Affairs in partial fulfillment of the requirements for the degree of Master of Applied Sciences in Electrical Computer Engineering, Carleton University, Ontario, Canada, Apr. 2012.

(56) References Cited

OTHER PUBLICATIONS

Girling, Gary, "Covert Channels in LAN's," IEEE Transactions on Software Engineering, vol. SE-13, No. 2, Feb. 1987.
Handel, Theodore, et al., "Hiding Data in the OSI Network Model," Weapon Design Technology Group, Los Alamos, NM 87545, pp. 23-38.
Ji, Liping, et al., "A Novel Covert Channel Based on Length of Messages," 2009 International Symposium on Information Engineering and Electronic Commerce, Harbin Institute of Technology, Shenzhen Graduate School Shenzhen, P.R. China.
Kondo, Yoshihisa, et al., "Wake-up Radio using IEEE 802.11 Frame Length Modulation for Radio-on-Demand Wireless LAN," 2011 IEE 22nd International Symposium on Personal, Indoor and Mobile Radio Communications.
Kratzer, Christian, et al., "WLAN Steganography: A First Practical Reivew," Copyright 2006 ACM 1-59593-493-6060009, Department of Computer Science, Research Group Multimedia and Security, MM & Sec '06, Sep. 26-27, 2006, Geneva, Switzerland.
Lucena, Norka B., et al., "Covert Channels in IPv6," Syracuse University, Syracuse, NY 13244 USA, Copyright 2006, Springer-Verlag Berlin Heidelberg 2006, pp. 147-166.
Padlipsky, M.A., et al., "Limitations of End-to-End Encryption in Secure Computer Networks", Deputy for Technical Operations, Electronic Systems Division, Air Force Systems Command, Hanscom Air Force Base, Massachusetts; Pepared by The Mitre Corporation, Project 672B, Aug. 1978.
Panajotov, Boris, et al, "Covert Channels in TCP/IP Protocol Stack," ICT Innovations 2013 Web Proceedings ISSN 1857-7288, University "Goce Delcev", Faculty of Computer Science, "Krste Misirkov" bb, 2000, Stip, Republic of Macedonia, pp. 190-199.
Scott, Carlos, "Network Covert Channels: Review of Current State and Analysis of Viability of the Use of X.509 Certificates for Covert Communications," Technical Report RHUL-MA-2008-11, Jan. 15, 2008, Royal Holloway University of London, Department of Mathematics, England.
Stelte, Bjorn, et al., "Concealed Integrity Monitoring for Wireless Sensor Networks," Wireless Sensor Network, 2011, 3, 10-17, doi: 10.4236/wsn.2011.31002, Published online Jan. 2011, http://www.scirp.org/journal.wsn.
Wolf, Manfred, "Covert Channels in LAN Protocols," Tele-Consulting GMBH, Germany, pp. 91-101.

Yuan, Bo, et al., "A Covert Channel in Packet Switching Data Networks," Department of Networking, Security and Systems Administration, Rochester Institute of Technology, Rochester, NY 14623.
Zander, Sebastian, et al., "A Survey of Covert Channels and Countermeasures in Computer Network Protocols," 3rd Quarter 2007, vol. 9, No. 3, IEE Communications Survey, The Electronic Magazine of Original Peer-Reviewed Survey Articles, www.comsoc.org/pubs/surveys.
Zander, Sebastian, "Performance of Selected Noisy Covert Channels and Their Countermeasures in IP Networks," Thesis submitted in accordance with the requirements for the degree of Doctor of Philosophy, Swinburne University of Technology, Melbourne, Australia, Copyright May 2010.
Zhang, Xinyu, et al., "Gap Sense: Lightweight Coordination of Heterogeneous Wireless Devices," University of Wisconsin-Madison and the University of Michigan-Ann Arbor, supported in part by NSF Grant CNS-1160775.
Patent Cooperation Treaty, International Searching Authority, "Notification of Transmittal of the International Search Report and the Written Opinion," PCT Application No. PCT/US16/27280; dated Jul. 15, 2016.
Patent Cooperation Treaty, "International Preliminary Report on Patentability," PCT Application No. PCT/US2014/028889, dated Sep. 15, 2015.
Chinese Intellectual Property Office, Patent Application No. 201480028106.0, English translation of First Office Action dated Jul. 14, 2017.
Chinese Intellectual Property Office, Patent Application No. 201480028106.0, English translation of Third Office Action dated Aug. 16, 2018.
European Patent Office, EP Patent Application No. 14771024.8, Examination Report No. 1, dated Apr. 25, 2017.
European Patent Office, EP Patent Application No. 14771024.8, Examination Report No. 2, dated Feb. 19, 2018.
Korean Intellectual Property Office (KIPO), Patent Application No. 10-2015-7029467, English translation of Office Action, received from Korean associates dated Aug. 21, 2017.
Korean Intellectual Property Office (KIPO), Patent Application No. 10-2015-7029467, English translation of Office Action, received from Korean associates dated Jul. 10, 2018.

* cited by examiner

METHODS AND APPARATUS FOR WIRELESS COMMUNICATION VIA A PREDEFINED SEQUENCE OF A CHANGE OF A CHARACTERISTIC OF A WIRELESS SIGNAL

CROSS-REFERENCE TO RELATED PATENT APPLICATION

This application claims priority to and the benefit of U.S. Provisional Application No. 61/782,220, filed Mar. 14, 2013 entitled "Apparatus and Methods for Wireless Communication via Transitions between Operating States of a Radio," which is incorporated herein by reference in its totality.

BACKGROUND

Some embodiments described herein relate generally to system and methods for implementing wireless communication between a wireless communication device and a wireless peripheral device via a predefined sequence of changes of either the state, protocol, mode of operation, or contents of a packet of the wireless communication device that results in changes in a characteristic of a wireless signal detectable by an ultra-low power (ULP) receiving circuit on the wireless peripheral device.

Known wireless communication devices such as a typical mobile telephone or a tablet personal computer (PC) each typically includes one of several types of commercial transceiver or radios, such as multi-band cellular, Wi-Fi®, Bluetooth®, and Global Positioning System (GPS). Each of these transceivers includes an integrated circuit (IC), or collection of ICs designed for a specific wireless communication standard (e.g., the Bluetooth® standard). Furthermore, the wireless standards are defined by a group such as the Institute of Electrical and Electronics Engineers (IEEE) (e.g., Wi-Fi®), or by a consortium (e.g., Bluetooth®). Such wireless standards typically have mandatory modes that must be supported by an IC to be considered "compliant" with that standard. Compliance with the standard is used to provide interoperability among devices from different manufactures. Because of the complexity of these standards, and the "overhead" circuits used to support at least the mandatory functionality of the standard, transceiver ICs that are standard-compliant typically consume higher power than custom transceivers that do not target any specific standard. For example, a Bluetooth®-compliant transceiver from Texas Instruments (TI) typically consumes >40 mW in the active mode, while a proprietary transceiver from Energy Micro consumes <10 mW.

Any wireless peripheral device such as, for example, a headset or a stereo, that wirelessly connects to a wireless communication device typically does so using one of the wireless connectivity standards the wireless communication device supports (e.g. iPhone®: Wi-Fi® and Bluetooth®; Galaxy SIII®: Wi-Fi®, Bluetooth®, and Near Field Communication). This means the wireless peripheral device typically also uses a standard-compliant IC to provide interoperability between the wireless communication device and the wireless peripheral device. While the wireless communication device can typically be recharged periodically (e.g., nightly), wireless peripheral devices are not recharged as frequently, they typically operate for longer periods of time off a single charge, and they usually are powered by smaller batteries than those in the wireless communication device. Therefore, it is desirable for the power consumption of the transceiver on the wireless peripheral device to be significantly smaller than that of the wireless communication device, and it is desirable for the power consumption on the wireless peripheral device to be adequately managed so as to provide long battery lifetime.

Wireless peripheral devices typically can either set their transceivers into a low-power "sleep" mode, or turn them off entirely, to reduce the power consumption. This is typically referred to as "duty cycling". Problematic situations, however, can arise when a wireless communication device attempts to wirelessly communicate with the wireless peripheral device during such "sleep" and/or "off" modes when the wireless peripheral device's transceiver is powered off and unable to receive messages from the wireless communication device. This presents a tradeoff between the latency in communicating with a wireless peripheral device, and the power consumed by the wireless transceiver on the wireless peripheral device. More frequent turning on of the wireless transceiver leads to lower latency, but higher average power consumption, and vice versa.

Accordingly, a need exists for apparatus and methods that allow a wireless communication device to wirelessly communicate with a wireless peripheral device while the wireless peripheral device is in a low power "sleep" mode, with its main wireless transceiver in the "sleep" or "standby" mode.

SUMMARY

Figure 1A:
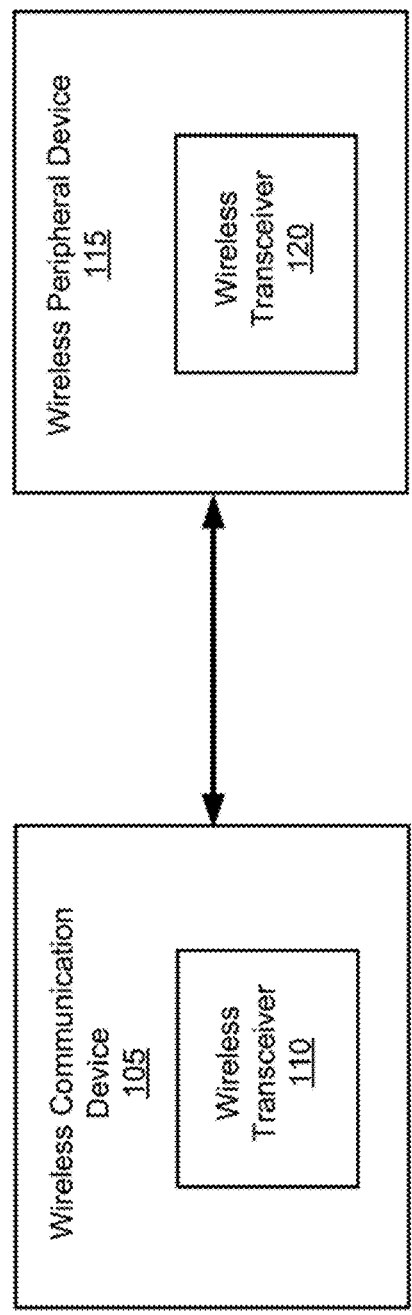
FIG. 1A is a schematic illustration of a communication system that includes a wireless communication device and a wireless peripheral device, according to an embodiment.

In some embodiments, an apparatus includes a wireless receiver circuit that can receive a wireless signal from a wireless communication device that is (1) separate from the wireless receiver circuit and (2) can encode a first information according to a protocol. The wireless receiver circuit can detect a predefined sequence of changes of a characteristic within the wireless signal to decode, from the wireless signal, a second information mutually exclusive from the first information without decoding the first information. In such embodiments, the wireless receiver circuit can send the second information.

DETAILED DESCRIPTION

In some embodiments, an apparatus includes a wireless receiver circuit that can receive a wireless signal from a wireless communication device that is (1) separate from the wireless receiver circuit and (2) can encode a first information according to a protocol. The wireless receiver circuit can detect a predefined sequence of changes in a characteristic of the wireless signal to decode, from the wireless signal, a second information mutually exclusive from the first information without decoding the first information. In such embodiments, the wireless communication device can send the second information.

In some other embodiments, an apparatus includes a wireless communication device that can encode a first information according to a protocol to produce a first signal. The wireless communication device can send to a wireless receiver circuit separate from the wireless communication device, a wireless signal based on the first signal and having a predefined sequence of changes of a characteristic that represent a second information mutually exclusive form the first information such that the wireless receiver circuit decodes the second information without decoding the first information.

Some apparatus and methods for wireless communication are described that encode the second information into i) the operating states of a wireless transceiver, ii) changes to the first information sent by the wireless transceiver that result in a predefined sequence of changes in a characteristic of the wireless signal that is decoded by the wireless receiver circuit without decoding the first information, or iii) a predefined sequence of changes in the protocol being used by the wireless transceiver that is decoded by the wireless receiver circuit without decoding the first information. Said another way, in some embodiments, wireless communication between a wireless communication device and a wireless peripheral device can be performed via a predefined sequence of changes of either the state, protocol, mode of operation, or contents of a packet of the wireless communication device that results in changes in a characteristic of a wireless signal detectable by an ultra-low power (ULP) receiving circuit on the wireless peripheral device. This method of communication can be beneficial for low-power wireless peripheral devices that communicate with a wireless communication device such as known cellular phones that includes only standard-compliant wireless transceivers (e.g., radios). A known cellular phone can transmit a wireless message (the second information) by controlling the sequence of operating states of one of its (commercial) wireless transceivers. An ultra-low power wireless transceiver (in a wireless peripheral device) can detect the state transitions by monitoring the transmitted signals from the standard cellular phone and observing a predefined sequence of changes of a characteristic of the wireless signals (e.g., indicative of the current state of the wireless transceiver), without having to decode the first information, and then decodes this sequence to recover the message.

As used in this specification, a "module" can be, for example, any assembly and/or set of operatively-coupled electrical components associated with performing a specific function(s), and can include, for example, a memory, a processor, electrical traces, optical connectors, software (that is stored in memory and/or executing in hardware) and/or the like.

As used in this specification, the singular forms "a," "an" and "the" include plural referents unless the context clearly dictates otherwise. Thus, for example, the term "a wireless communication device" is intended to mean a single wireless communication device or a combination of wireless communication devices.

FIG. 1A is a schematic illustration of a communication system that includes a wireless communication device and a wireless peripheral device, according to an embodiment. The system 100 includes a wireless communication device 105 in wireless communication with wireless peripheral device 115, whereby both the wireless communication device 105 and the wireless peripheral device 115 include wireless transceivers that comply with one or multiple standard wireless communication protocols. The wireless communication device 105 can be any mobile wireless communication device such as, for example, a laptop computer, a personal digital assistant (PDA), a standard cellular phone, a smart phone, a tablet personal computer (PC), and/or so forth. The wireless communication device 105 includes a (standard protocol compliant) wireless transceiver 110. The wireless transceiver 110 can include one or multiple wireless port(s). The wireless port(s) in the wireless transceiver 110 can send and/or receive wireless signals such as, for example, wireless radio frequency (RF) signals via a variety of wireless communication protocols such as, for example, wireless fidelity (Wi-Fi®) protocol, Bluetooth® 4.0 protocol, cellular protocol (e.g., third generation mobile telecommunications (3G) or fourth generation mobile telecommunications (4G) protocol), 4G long term evolution (4G LTE) protocol), Near Field Communication (NFC) protocol, and/or the like.

The wireless peripheral device 115 can be any wireless peripheral device such as, for example, a headset, a stereo, a computer mouse, an electronic pen or stylus, and/or the like. The wireless peripheral device 115 includes a (standard protocol compliant) wireless transceiver 120. The wireless transceiver 120 can include one or multiple wireless port(s). The wireless port(s) in the wireless transceiver 120 can send and/or receive wireless signals such as, for example, wireless radio frequency (RF) signals via a variety of wireless communication protocols such as, for example, wireless fidelity (Wi-Fi®) protocol, Bluetooth® 4.0 protocol, cellular protocol (e.g., third generation mobile telecommunications (3G) or fourth generation mobile telecommunications (4G) protocol), 4G long term evolution (4G LTE) protocol), Near Field Communication (NFC) protocol, and/or the like.

Although not shown in FIG. 1, any number of communication networks can be operatively coupled to the wireless communication device 105 to allow wireless communication device 105 to communicate with other wireless and/or wired communication devices. For example, such communication networks can be any type of network (e.g., a local area network (LAN), a wide area network (WAN), a virtual network, and a telecommunications network) implemented as a wired network and/or wireless network. As described in further detail herein, in some embodiments, for example, the wireless communication device 105 can be connected to the wireless peripheral device 115 and/or any other device via the communication network that can include an intranet, an Internet Service Provider (ISP) and the Internet, a cellular network, and/or the like.

In the configuration shown in FIG. 1A, the wireless communication device 105 can establish wireless communication session with the wireless peripheral device 115 via any of the wireless communication standards discussed above. Each of the wireless transceiver 110 and the wireless transceiver 120 includes a wireless transmitter circuit (e.g., a first integrated circuit (IC)) and/or a wireless receiver circuit (e.g., a second integrated circuit (IC)), and in some configurations, a collection of additional ICs (not shown in FIG. 1A) that is designed to enable communication via one or more of the specific standard wireless communication protocols such as the standard wireless communication protocols discussed above. Such wireless standard protocols typically have mandatory modes that are supported for an IC to be considered "compliant" with that standard. Because of the high complexity of such wireless communication standards, significant "overhead" circuitry is typically included in the ICs that are used to support the standard-compliant functionality. Hence, such wireless transceiver ICs that are wireless standard-compliant typically consume a significant amount of power even when the wireless communication device 105 and/or the wireless peripheral device 115 is in an "inactive" or "sleep" mode. This can be problematic especially for the case of the wireless peripheral devices 115 that are typically not recharged frequently, and typically operate for long periods of time by drawing power from small batteries.

It would be advantageous if, however, a wireless peripheral device 115 had an ultra-low power (ULP) wireless transceiver (e.g., an ultra-low power radio) that was not necessarily completely compliant with a standard wireless communication protocol, and yet is still capable of receiving a subset of specific messages from the wireless communication device's wireless transceiver that is wireless standard-compliant. As a result, this ULP wireless transceiver could consume much lower power than a full standard-compliant wireless transceiver, thus extending the battery and operational lifetime of the wireless peripheral device. Alternatively, it would be advantageous if a standard-compliant wireless transceiver had an ULP mode of operation during which the standard-compliant wireless transceiver was powered on and able to wirelessly communicate, but only complied with a small subset of the mandatory modes specified by the wireless standard. Furthermore, it would be advantageous if the wireless communication device could send a specific signal using one of its standard-compliant wireless transceiver that could be uniquely detected by the wireless peripheral device 115 while in the ULP mode.

Figure 1B:
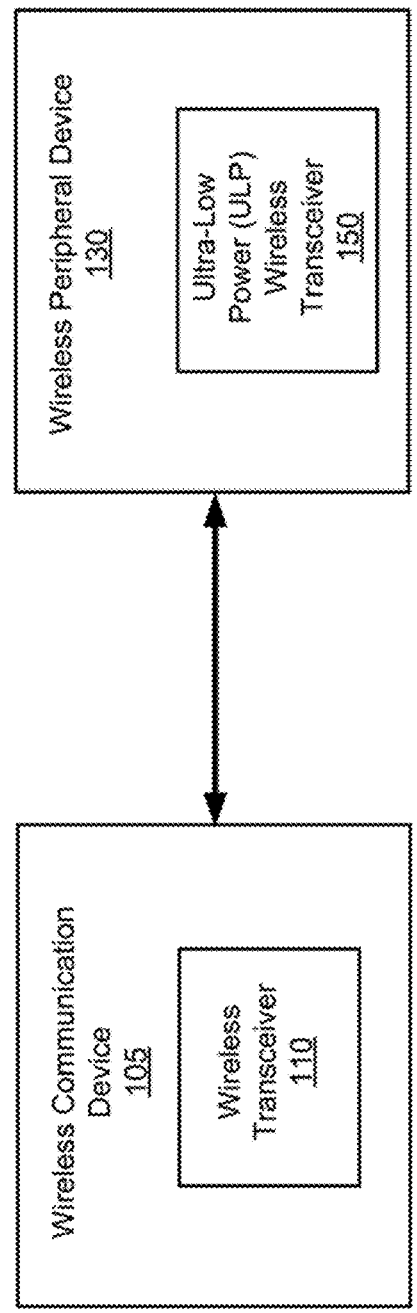
FIG. 1B is a schematic illustration of a communication system that includes a wireless communication device and a wireless peripheral device having an ultra-low power (ULP) wireless transceiver, according to an embodiment.

FIG. 1B is a schematic illustration of a communication system that includes a wireless communication device and a wireless peripheral device having an ultra-low power (ULP) wireless transceiver, according to an embodiment. The system 100' includes a wireless communication device 105 and a wireless peripheral device 130. The wireless communication device 105 includes a wireless transceiver 110 that is fully compliant with one or more of the standard wireless communication protocols discussed above. The wireless peripheral device 130 includes an ultra-low power (ULP) wireless transceiver 150 that is not fully compliant with one or more of the standard wireless communication protocol(s) discussed above. In the configuration shown in FIG. 1B, the wireless communication device 105 can establish a wireless communication session with the wireless peripheral device 130 via any of the wireless communication standards discussed above. Although the ULP wireless transceiver 150 (e.g., an ultra-low power radio) of the wireless peripheral device 130 is not completely compliant with one or more of the standard wireless communication protocols discussed above, it is still capable of receiving a subset of specific messages from the wireless communication device's 105 wireless transceiver 110 that is wireless standard-compliant. As a result, this ULP wireless transceiver 150 can consume significantly lower power than a full standard-compliant wireless transceiver, thus extending the battery and operational lifetime of the wireless peripheral device. The wireless peripheral device 130 and the ULP wireless transceiver 150 will be discussed in greater detail in relation to FIG. 2.

Figure 2:
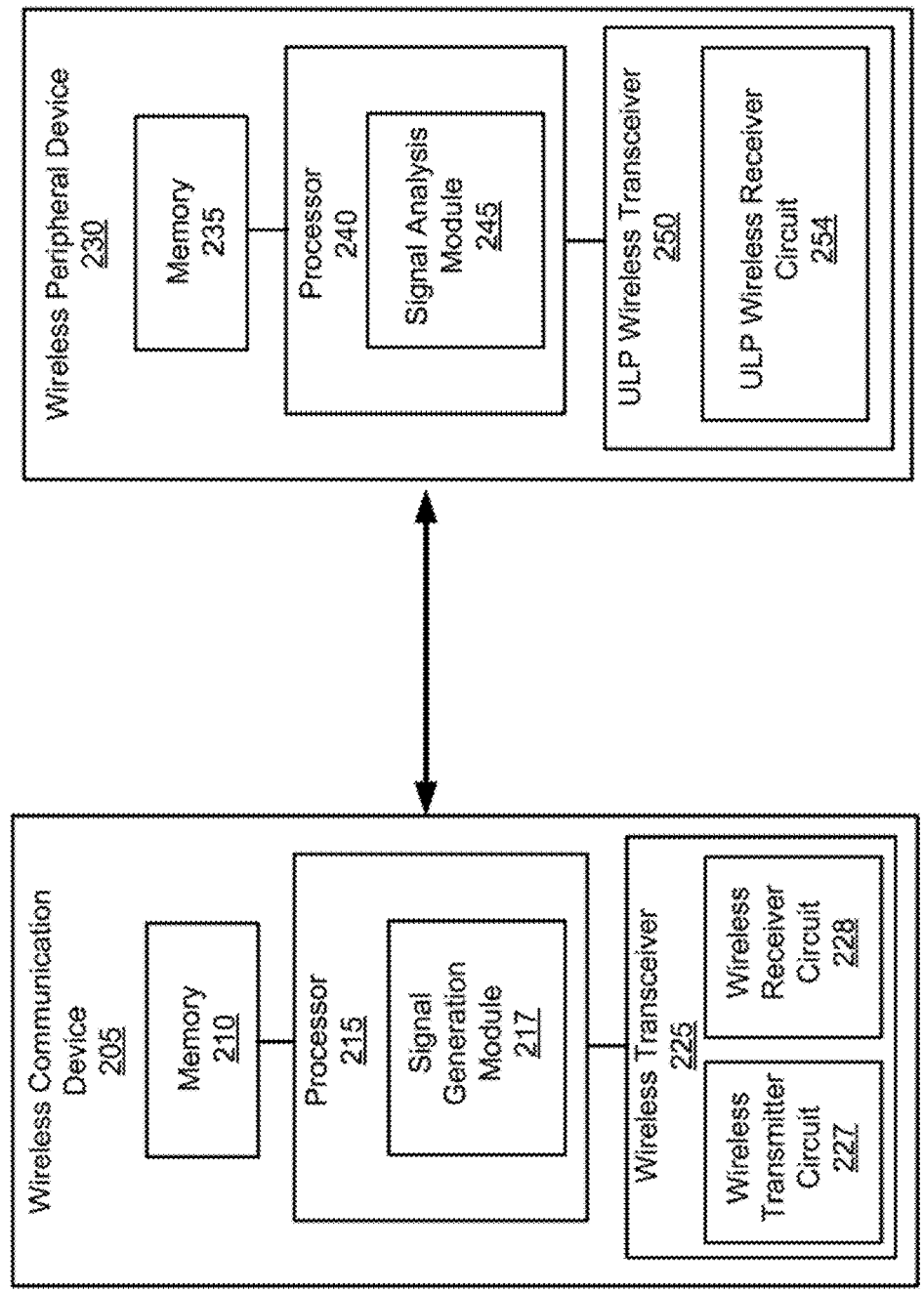
FIG. 2 is a schematic illustration of an asymmetric communication system that includes a wireless communication device and a wireless peripheral device, according to an embodiment.

FIG. 2 is a schematic illustration of a communication system that includes a wireless communication device and a wireless peripheral device, according to an embodiment. The communication system 200 includes a wireless communication device 205 in wireless communication with wireless peripheral device 230, whereby the wireless communication device 205 includes a wireless transceiver 225 that complies with one or multiple standard wireless communication protocols, and the wireless peripheral device 230 includes an ULP wireless transceiver 250 that does not fully comply with the standard wireless communication protocol(s) used by the wireless communication device 205.

The wireless communication device 205 is similar to the wireless communication device 105 shown in FIG. 1B and can be any mobile wireless communication device such as, for example, a laptop computer, a personal digital assistant (PDA), a standard cellular telephone, a smart phone, a tablet personal computer (PC), and/or so forth. The wireless communication device 205 includes a memory 210, a processor 215, and a wireless transceiver 225.

The memory 210 can be, for example, a random access memory (RAM), a memory buffer, a hard drive, a database, an erasable programmable read-only memory (EPROM), an electrically erasable read-only memory (EEPROM), a read-only memory (ROM) and/or so forth. The memory 210 can store instructions to cause the processor 215 to execute modules, processes and/or functions associated with the wireless communication device 205 and/or the communication system 200. The processor 215 can be, for example, a general purpose processor, a Field Programmable Gate Array (FPGA), an Application Specific Integrated Circuit (ASIC), a Digital Signal Processor (DSP), and/or the like. The processor 215 can run and/or execute applications, modules, processes and/or functions associated with the wireless communication device 205 and/or the communication system 200.

The processor 215 includes a signal generation module 217. The signal generation module 217 can be a hardware and/or software module (that is stored in memory 210 and/or executed in processor 215). In some configurations, the signal generation module 217 can generate and/or define a signal according to a specific standard wireless communication protocol and encode a first information within the signal. This signal can then be sent as a wireless signal via an antenna (not shown) of wireless communication device 205. In such configurations, the wireless signal includes a characteristic that is associated with activeness of the wireless communication device 205, and where a predefined sequence of the changes of the characteristic represents a second information, where the first information is mutually exclusive from the second information.

In some instances, the characteristic within the wireless signal can be the length of each data unit (e.g., data packets and/or data frames) within the wireless signal, and the changes in the length of each data unit can represent the second information. In other instances, the characteristic within the wireless signal can be a length of a payload of each data unit within the wireless signal, and the changes in the length of a payload of each data unit can represent the second information. In some other instances, the characteristic within the wireless signal can be a time sent for each data unit within the wireless signal, and the changes in the time sent for each data unit can represent the second information. In yet other instances, the characteristic within the wireless signal can be a time interval between adjacent data units within the wireless signal, and the changes in the time interval between the adjacent data units can represent the second information. In other instances, the characteristic within the wireless signal can be packet rate modulation for data units within the wireless signal, and the changes in the packet-rate modulation can represent the second information. In other instances, the characteristic within the wireless signal can be a channel frequency for data units within the wireless signal, and the changes in the channel frequency can represent the second information.

The wireless transceiver 225 can include a wireless transmitter circuit 227 and a wireless receiver circuit 228. The wireless transmitter circuit 227 can include one or multiple wireless port(s). The wireless port(s) in the wireless transmitter circuit 227 can send data units (e.g., data packets, data frames, etc.) via a variety of standard wireless communication protocols such as, for example, a wireless fidelity (Wi-Fi®) protocol, a Bluetooth® 4.0 protocol, a cellular protocol (e.g., a third generation mobile telecommunications (3G) or a fourth generation mobile telecommunications (4G) protocol), 4G long term evolution (4G LTE) protocol), a Near Field Communication (NFC) protocol, and/or the like. The wireless transmitter circuit 227 can send to the ULP wireless receiver circuit 254 a wireless signal containing the encoded first information and having changes of a characteristic that represent a second information mutually exclusive from the first information (encoded by the signal generation module 217).

The wireless receiver circuit 228 can include one or multiple wireless port(s). The wireless port(s) in the wireless receiver circuit 228 can receive data units (e.g., data packets, data frames, etc.) via a variety of standard wireless communication protocols such as, for example, a wireless fidelity (Wi-Fi®) protocol, a Bluetooth® 4.0 protocol, a cellular protocol (e.g., a third generation mobile telecommunications (3G) or a fourth generation mobile telecommunications (4G) protocol), 4G long term evolution (4G LTE) protocol), a Near Field Communication (NFC) protocol, and/or the like. The ULP wireless receiver circuit 254 can have a net power gain of no more than unity before at least one of a down-conversion of the RF wireless signal or detection of the RF wireless signal.

The wireless peripheral device 230 can be any wireless peripheral device such as, for example, a headset, a stereo, a computer mouse, an electronic pen or stylus, and/or the like. The wireless peripheral device 230 includes a memory 235, a processor 240, and an ultra-low power (ULP) wireless transceiver 250.

The memory 235 can be, for example, a random access memory (RAM), a memory buffer, a hard drive, a database, an erasable programmable read-only memory (EPROM), an electrically erasable read-only memory (EEPROM), a read-only memory (ROM) and/or so forth. The memory 235 can store instructions to cause the processor 240 to execute modules, processes and/or functions associated with the wireless peripheral device 230 and/or the communication system 200. The processor 240 can be, for example, a Field Programmable Gate Array (FPGA), an Application Specific Integrated Circuit (ASIC), a Digital Signal Processor (DSP), and/or the like. The processor 240 can run and/or execute applications, modules, processes and/or functions associated with the wireless peripheral device 230 and/or the communication system 200.

The processor 240 includes a signal analysis module 245. The signal analysis module 245 can be a hardware module and/or software module (that is stored in memory 235 and/or executed in processor 240) and is operably coupled to the ULP wireless transceiver 250. In some configurations, the signal analysis module 245 can detect a predefined sequence of changes of a characteristic within a wireless signal (sent by the wireless communication device 205) received by the ULP wireless transceiver 250 and decode from the received wireless signal a second information that is implicitly contained within the received wireless signal. The second information can be represented by a predefined sequence of changes of a characteristic such as, for example, a predefined sequence of transitions between operating states of the wireless communication device 205 that can indicate a message to the wireless peripheral device 230 (e.g., a "wake-up" message). In such instances, the signal analysis module 245 can decode the received wireless signal to decode the second information without decoding the first information encoded in the wireless signal.

The ULP wireless transceiver 250 can include a ULP wireless receiver circuit 254. The ULP wireless receiver circuit 254 can include one or multiple wireless port(s). The wireless port(s) in the ULP wireless receiver circuit 254 can receive a wireless signal(s) from the wireless communication device 205 that includes an encoded first information according to a standard wireless protocol. The ULP wireless receiver circuit 254 can communicate with the signal analysis module 245 to detect a predefined sequence of changes of a characteristic within the received wireless signal to decode, from the received wireless signal, a second information mutually exclusive from the first information without decoding the first information. In such instances, the wireless receiver circuit can send the second information to the processor 240. The second information can be associated with the activation state of the wireless communication device 205 (that can have a timing sequence) and can be representative of a message for the wireless peripheral device 230. Hence, the ULP wireless receiver circuit 254 is not completely compliant (or at least partially compliant) with the standard wireless communication protocol(s) discussed above, and is capable of receiving at least a subset of specific wireless signals (e.g., messages) sent from the wireless transceiver 225 (of the wireless communication device 205) that is fully compliant with the standard wireless communication protocol(s) discussed above. As a result, the ULP wireless transceiver 250 can consume significantly less power than a full wireless standard-compliant wireless transceiver (e.g., wireless transceiver 225).

In the communication system 200 presented in FIG. 2, a method for wireless communication between the wireless communication device 205 and the wireless peripheral device 230 involves the wireless communication device 205 encoding messages via a predefined sequence of changes of a characteristic of the wireless signal (e.g., a predefined sequence of transitions between operating states of the wireless communication device 205). The ULP wireless transceiver 250 that includes an ULP wireless receiver circuit 254 can detect the predefined sequence of changes by monitoring the transmitted signals from the wireless communication device 205, and decoding the predefined sequence of changes (in association with the signal analysis module 245) to recover the message. Hence, by encoding a message into the predefined sequences of changes in the wireless signal, a message can be relayed to the wireless peripheral device 230 wirelessly without requiring the ULP wireless transceiver 250 to be fully compliant with any standard wireless communication protocol (e.g., the wireless communication protocol used by the wireless communication device 205).

Figure 3:
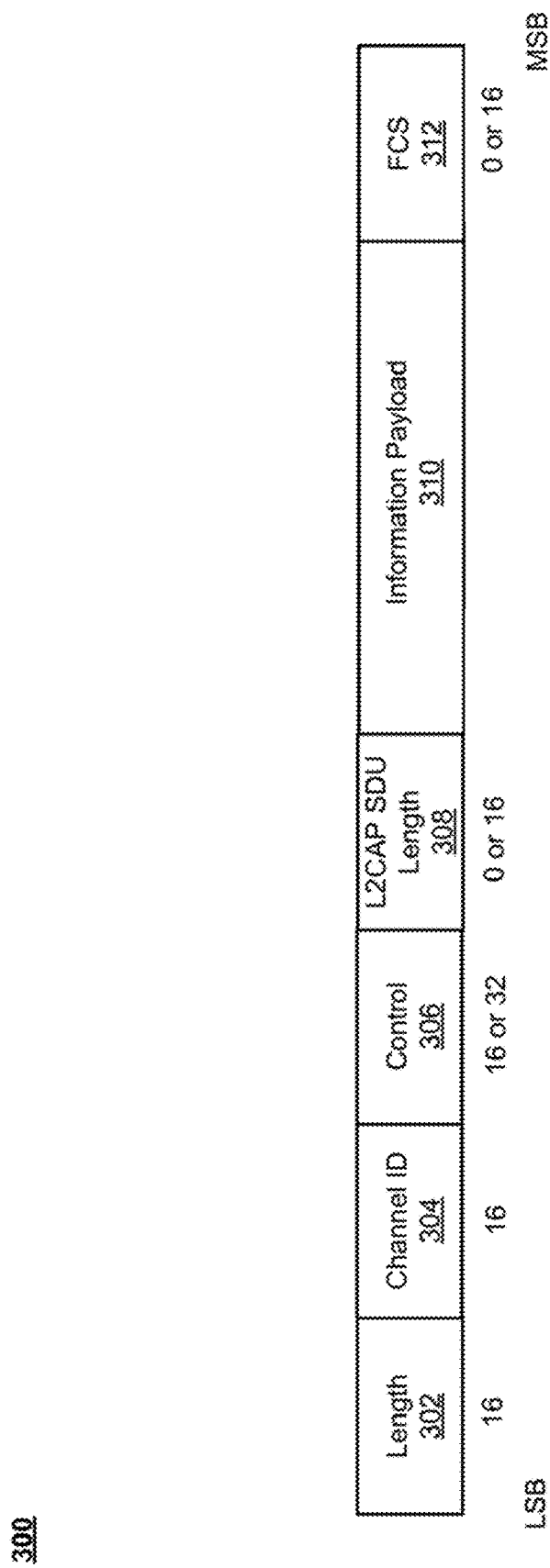
FIG. 3 is a schematic illustration of a known wireless data packet, according to an embodiment.

Known wireless transceivers structure information into data units such as, for example, data packets, and wirelessly transmit one data packet at a time. The structure of a wireless data packet can vary depending on the standard wireless communication protocol, but in general can resemble, for example, the structure of a standard Bluetooth® data packet as shown in FIG. 3. A wireless data packet 300 typically has three main sections: 1) header, 2) payload, and 3) footer. The data packet 300 begins with a header used for synchronizing the source and destination wireless transceivers (e.g., wireless transceiver 225 and ULP wireless transceiver 250 as shown in FIG. 2), and includes information on the packet length, data rate, source address, destination address and routing information, etc. The header section in the wireless data packet 300 shown in FIG. 3 includes the length portion 302 and the channel ID 304 portion. LSB stands for the "least significant bit" and MSB stands for the "most significant bit". As described above, the length portion 302 can be 16 bits (2 bytes) long and can include information about the length or size of the data packet 300. The channel ID portion can be 16 bits long and can contain information about the port ID of the source wireless transceiver (e.g., wireless transceiver 225 as shown in FIG. 2) and/or the port ID of the destination wireless transceiver (e.g., ULP wireless transceiver 250 as shown in FIG. 2).

The wireless data packet 300 can, optionally, also include a control portion 306 that can be either 16 bits or 32 bits long. The control portion 306 can include information related to data packet transmission from the source device to the destination device such as, for example, data packet encapsulation protocol, tunneling protocol, and/or the like. Also, optionally, the wireless data packet 300 can also include an L2CCP SDU length portion 308 that can be 0 to 16 bits long. The L2CAP SDU length portion 308 can include information associated with the length of the service data units (SDU) in the Bluetooth® protocol that are associated with logical link control and the adaptation protocol (L2CAP) layer. The L2CAP layer forms an interface to standard data transport protocols and can handle the multiplexing of higher layer protocols and the segmentation and reassembly (SAR) of large data packets.

Following the header section is the payload section, which carries the bulk of the data to be transmitted (the "user data"). In FIG. 3, the payload section is represented by the information payload portion 310 of the data packet 300. The bit size of the information payload portion 310 can vary depending on the amount of information that the data packet is carrying. Following the payload section is a footer section, which may contain error correction information and/or a termination symbol. In FIG. 3, the footer section is represented by the frame check sequence (FCS) portion 312 which can be either 0 or 16 bits in length. The FCS portion 312 adds an extra bits and/or characters (a checksum) to the data packet 300 for error detection and control in a format that is specific to the particular standard wireless communication protocol used. For example, in some instances, the source device (e.g., wireless transceiver 225 in FIG. 2) calculates the FCS checksum prior to transmitting the data packet, which is verified and compared at the destination device (e.g., ULP wireless transceiver 250 in FIG. 2). If the FCS data detected at the destination device matches with the expected FCS checksum set at the source device, the transmission is considered successful. If not, the data packet 300 is automatically discarded due to error.

A fully standard wireless communication protocol-compliant wireless transceiver is typically used to generate, transmit, receive, and demodulate data units (e.g., data packets, data frames, etc.) that comply with a specific standard wireless communication protocol. Data units are the primary vehicle for wirelessly transmitting user data or messages from one communication device to another. For example, the audio data exchanged between a cellular phone and a wireless headset is carried in the payloads of multiple data units. The primary goal of these transceivers is to transfer the data contained in the payload (the first information) from the transmitting device to the receiving device. The methods and apparatus of described herein of encoding information through a characteristic of the standard-compliant packet. For example, one characteristic of the standard-compliant packet is its length. The length varies as a function of the amount of data in the payload of the packet. Therefore, controlling the variation of this length can be used to encode information. The wireless transceiver can vary the amount of data put in the packet based on the second information to be encoded. Therefore, the second information is encoded in the length of the packet, and decoded by an ULP receiver circuit that measures the length of the packet, and need not necessarily decode the first information contained in the packet payload. The power consumption of a receiver circuit to measure the packet length (without decoding the first information) can be much lower power than a fully standard-compliant transceiver.

Known wireless transceivers support several modes of operation, referred to as "states" or "modes." The wireless communication device (e.g., a cellular phone, a smart phone, a personal digital assistant (PDA), a tablet personal computer (PC), etc.) controlling a wireless transceiver (e.g., a radio) can direct the wireless transceiver to enter a certain state, or the wireless transceiver may transition between states automatically according to policies outlined in the standard wireless communication protocol. In any given operating state, the wireless transceiver can transmit data units that take on a state-specific structure, or the wireless transceiver can modify the rate at which data units are transmitted or the channel center frequency on which the data units are transmitted or, in some instances, the wireless transceiver may not transmit any data units (e.g., a power-down state). The following discussion relates to apparatus and methods to include and/or modulate a digital message via the higher-level operating states of a wireless transceiver. The following sub-sections describe examples of the modulation formats.

On-Off Keying Modulation by Turning a Radio On/Off

Initially, when the wireless transceiver is not in use, the wireless transceiver is in the "standby" mode or a "sleep" mode. The "standby" mode refers to a low power mode for the wireless transceiver that typically can save significantly on electrical power consumption compared to leaving the wireless transceiver in the "active" or "on" mode. Additionally, when the wireless transceiver is turned on from a "standby" mode, the device controlling the wireless transceiver can avoid having to reissue instructions or to wait for a reboot.

Turning on the wireless transceiver immediately puts the wireless transceiver into a "scan" mode in which scan data units (e.g., data packets) are transmitted. Turning the wireless transceiver off ceases all transmissions. By turning the wireless transceiver on/off with a specific timing sequence, a message can be encoded into the on/off pattern that is observed by an ULP wireless transceiver that only detects the presence/absence of transmitted data units. This technique resembles on/off keying (OOK) modulation, except that the individual symbols are represented by the on/off state of the standard (commercial) the wireless transceiver that is fully compliant with a standard wireless communication protocol. In one example of this technique, this is analogous to Morse code communication where "dashes" and "dots" are encoded by the length of time a wireless transceiver is left on and in the scan mode each time the wireless transceiver is turned on. By using an ULP receiver circuit that can detect the presence of a packet, it can decode the information.

It is also understood that the same effect of modulating the on/off state of a wireless transmitter can be accomplished a variety of different ways, not just by strictly changing the "state" of the transmitter. This can include, for example, changing the settings in the transceiver circuit (by reprogramming software or changing hardware), changing enable states of external components to the transceiver (such as an external power amplifier or a transmit/receiver switch), etc.

Packet-Length Modulation

Wireless transceivers typically use variable length data units, where the length of the data unit varies and depends on the amount of data that is included in the payload of the data unit. Hence, information can be encoded in the length of a data unit. For example, the wireless communication device (e.g., a cellular phone) could generate a sequence of data units containing dummy data in their payloads that, for example, can alternate between minimal length and maximum length, in a pattern that encodes a specific message. The message can be demodulated by using an ULP wireless transceiver that can detect the data unit length without demodulating the contents of the data unit. By using an ULP receiver circuit that can detect the presence of a packet and measure its length, or the length of a series of packets, the ULP receiver circuit can decode the information.

It is also understood that the length of transmission can be modulated in a variety of ways, not just by changing the length of the data unit. A series of packets can also be considered together as one transmission with a length represented by the series of packets, and changing the number of packets in the series therefore changes this length.

Packet-Position Modulation

Data units (e.g., data packets, data frames, etc.) are typically transmitted immediately when there is data to be sent by the wireless transceiver, often times according to a timing protocol defined by the wireless standard. Therefore, a device controlling the wireless transceiver could trigger the generation of a data unit by sending dummy data to the wireless transceiver. Information could be encoded by, for example, sending dummy data to the wireless transceiver at very specific instants in time, generating data units at these instants in time, in a pattern that encodes a specific message. The message could be demodulated by using an ULP wireless transceiver that can detect the presence of data units and can measure the relative time that the data units arrive, without demodulating the contents of the data unit. By using an ULP receiver circuit capable of detecting the time at which a packet arrives, the ULP receiver circuit can decode the second information.

It is understood that the wireless transceiver could alter the transmission times of packets in a number of ways including, for example, by changing the scheduling of packets in a time division multiple access framework, or by altering the delay of a transmission through software or hardware (where the hardware could be external to the wireless transceiver).

Packet-Rate Modulation

In some modes of operation, a wireless transceiver can periodically transmit broadcast data units requesting other wireless peripheral devices respond with their current status. The rate of this broadcast is a parameter that can be configured. Information could be encoded in the rate at which these broadcast data units are transmitted. For example, a wireless communication device (e.g., a cellular phone) could, for example, alternate between broadcasting at the minimum rate and maximum rate, in a pattern that encodes a specific message. The message could be demodulated by using an ULP wireless transceiver that can detect the rate at which data units are transmitted, without demodulating the content of the data units. By using a ULP receiver circuit that can detect the presence of a packet and measure the rate at which packets are received, the ULP receiver circuit can decode the information.

It is also understood that the packet rate can be changed in a variety of ways, not specifically for devices that have a broadcast mode.

Channel-Modulation

Wireless transceivers typically operate on one of several channels, or may include frequency-hopping in which the wireless transceiver channel is changed frequently to spread the communication over a wide range of frequencies (i.e., improving diversity and reliability of communication). Information can be encoded by, for example, directing the wireless transceiver to switch between specific channels, or switch between different hopping sequences, in a pattern that encodes a specific message. The message could be demodulated by using an ULP wireless transceiver that can detect the channel at which a data unit was transmitted on, without demodulating the contents of the data unit. By using an ULP receiver circuit that can detect the presence of packets and the channel they are transmitted on, the ULP receiver circuit can decode the information.

Amplitude Modulation (AM)

A wireless transceiver typically has the ability to control the output power of the power amplifier (PA). The transceiver can encode information into the output power level used by the PA. This can be accomplished, for example, in software (executing on a processor) by changing settings of the transceiver or external power amplifier. Alternatively, this can be accomplished in hardware by changing or having a different circuit, attenuation level, or external switch settings. An ULP receiving circuit could measure the received power levels of a series of packets, and by differentiating between the two levels decode the secondary information.

Modulate Contents of the Packet

A wireless transceiver typically has the ability to control the information that is used in the different sections of a packet it is transmitting. For example, it can control the destination address, the data in the payload, etc. Normally this data is assumed to be random, and in many cases a scrambler is used in the wireless transceiver as specified by a standard to ensure the transmitted signal characteristics (e.g. its frequency response) appear random. If the contents of the packet (e.g. payload data), however, are given a very specific value, the transmitted signal will have a detectable characteristic, such as a certain pattern in the frequency- or time-domain. Different packet contents therefore produce changes in these characteristics. Therefore, in this embodiment, the wireless transceiver can encode secondary information into very specific packet content to produce a predefined sequence of changes in the signal characteristics, which may then be detected and decoded by an ULP wireless receiving circuit.

Specific Example using Bluetooth® 4.0 Standard

Figure 4:
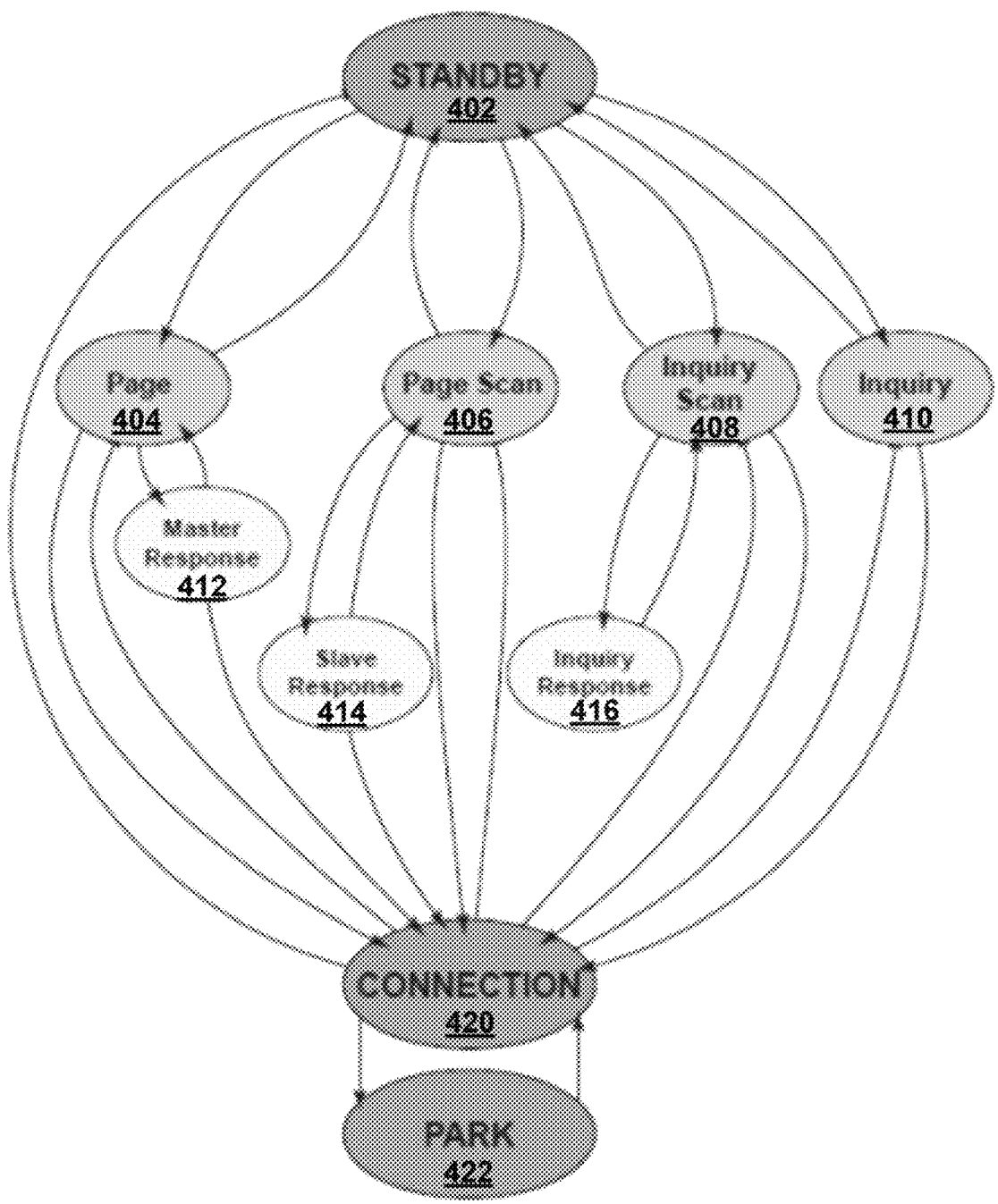
FIG. 4 is a state diagram that illustrates a method of communication of a Bluetooth® compliant wireless transceiver, according to an embodiment.

FIG. 4 is a state diagram that illustrates a method of communication of a Bluetooth® compliant wireless transceiver, according to an embodiment. The method of communication 400 described in FIG. 4, however, could be more broadly applied to a wireless transceiver that is compliant of any other standard wireless communication protocol besides Bluetooth®. According to the Bluetooth® 4.0 standard, every Bluetooth® compliant wireless transceiver is configured to support several mandatory modes and states of operation. The mandatory modes and states of operation as illustrated in FIG. 4 are described in detail in the Bluetooth® 4.0 Standard Document entitled "Specification of the Bluetooth® System", version 4.0, volume 0, dated Jun. 30, 2010, the disclosure of which is incorporated herein by reference in its entirety.

Each mode and state shown in FIG. 4 has a specific function. For example, the STANDBY state 402 is the default, low-power state where the wireless transceivers are off (nothing transmitted or received), and only a timer may be active in the Bluetooth® wireless transceivers. From the STANDBY state 402, the wireless transceiver may only transition into either the PAGE states (e.g., page state 404, page scan state 406) or the INQUIRY states (e.g., inquiry scan state 408, inquiry state 410). In the PAGE or INQUIRY states, the master Bluetooth® wireless transceiver (e.g., the wireless transceiver 225 shown in FIG. 2) enters a scanning mode during which the master Bluetooth® wireless transceiver can search for new wireless devices with which to pair (INQUIRY), or solicit information about previously paired devices (PAGE). The process of PAGING and INQUIRY for a new wireless device can involve one or multiple transitional states such as, for example, a master response state 412, a slave response state 414 where a slave is defined as a new (fully compliant or partially compliant) Bluetooth® device (e.g., the ULP wireless transceiver 250 shown in FIG. 2) different from the master Bluetooth® wireless transceiver, an inquiry response state 416. If as a result of the PAGE or INQUIRY states of the master Bluetooth® wireless transceiver, any new wireless device is discovered, the master Bluetooth® wireless transceiver synchronizes to the slave Bluetooth® device so communication can be established between the master Bluetooth® wireless transceiver and the slave Bluetooth® wireless transceiver, after which the two wireless transceivers (both master and slave) can transition to the CONNECTION state 420. In the CONNECTION state 420, data units are exchanged such as streaming digital voice to/from a headset or data files to a Bluetooth® peripheral device (e.g., wireless peripheral device 230 as seen in FIG. 2). This can be referred to as normal Bluetooth® operation, where data is exchanged in data units (e.g., data packets, data frames, etc.) in each of the states according to the Bluetooth® standard. If the CONNECTION state 420 successfully transmits data units wirelessly between the master Bluetooth® wireless transceiver and the slave Bluetooth® wireless transceiver for a pre-specified time period, a persistent wireless link (or connection) will be established between the master Bluetooth® wireless transceiver and the slave Bluetooth® wireless transceiver, and the master Bluetooth® wireless transceiver enters into a PARK state 422.

In some configurations described herein, wireless communication between a master Bluetooth® wireless transceiver and slave Bluetooth® wireless transceiver can be achieved by encoding user data into a sequence of state changes. This is in contrast with encoding user data into the payload of a data unit, as specified by the Bluetooth® standard.

Figure 5:
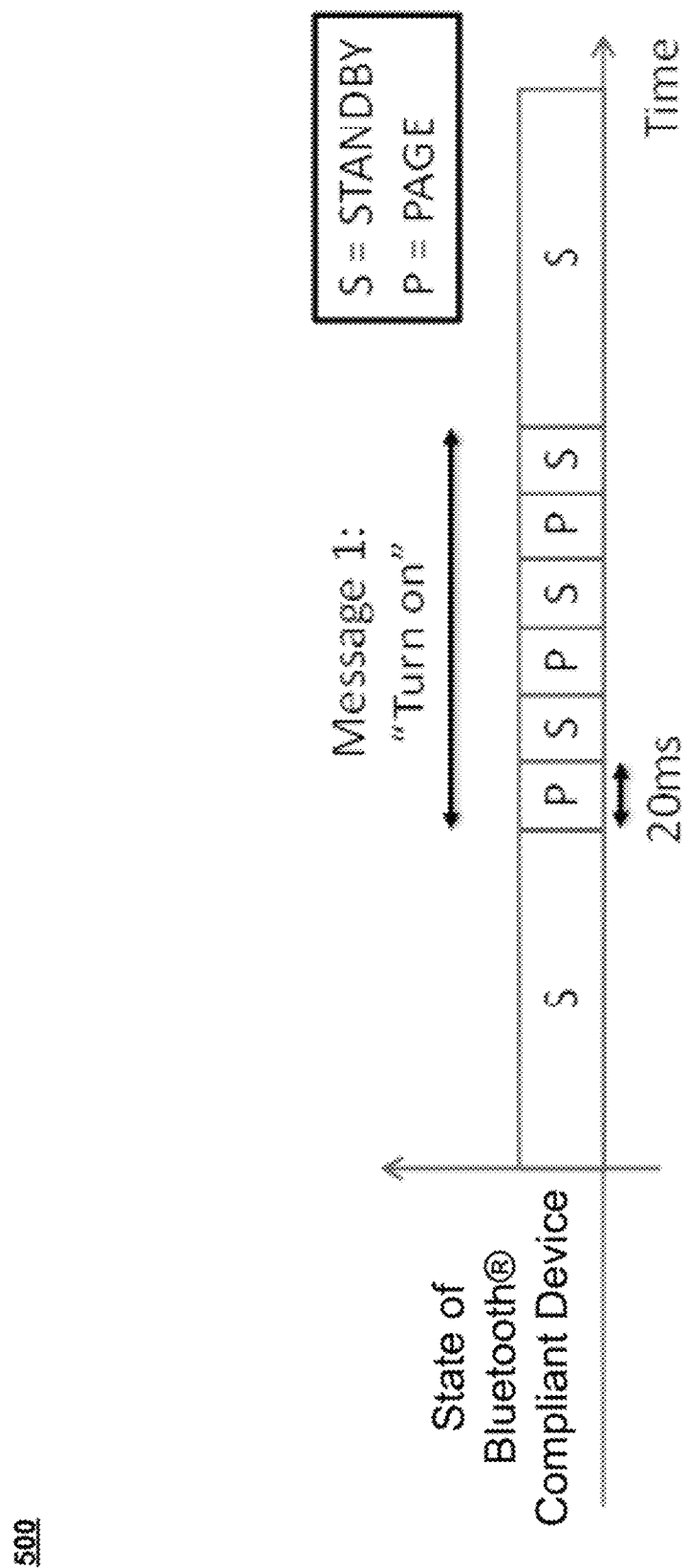
FIG. 5 shows an example of encoding a message in the transitions between states of a Bluetooth® compliant device supporting mandatory standby and page modes, according to an embodiment.

FIG. 5 shows an example of encoding a message in the transitions between states of a Bluetooth® compliant device supporting mandatory standby and page modes, according to an embodiment. The Bluetooth® compliant device can be, for example, the master Bluetooth® wireless transceiver discussed in FIG. 4. Referring to FIGS. 4 and 5, if the master Bluetooth® wireless transceiver is transitioned rapidly between the STANDBY state 402 and PAGE states (404 and/or 406) at an interval of 20 ms, a unique transmitted signal 500 is produced from the master Bluetooth® wireless transceiver. This unique transmitted signal could be recognized by a slave Bluetooth® wireless transceiver (e.g., wireless peripheral device 230 as seen in FIG. 2) and interpreted as a message such as, for example, "turn on". Changing the interval time could be used to denote a set of messages or to address different devices. For example, 20 ms intervals between state changes could encode the message "turn on device 1" and 30 ms intervals the message "turn on device 2", etc. A Bluetooth® compliant wireless transceiver (e.g., a Bluetooth® compliant radio) typically does not transition between these states at the above mentioned intervals under normal operating conditions; therefore these messages would be recognized as unique. Furthermore, the message encoded into state changes uses states existing in the Bluetooth® standard, therefore any Bluetooth®-compliant master device could send such messages.

Figure 6:
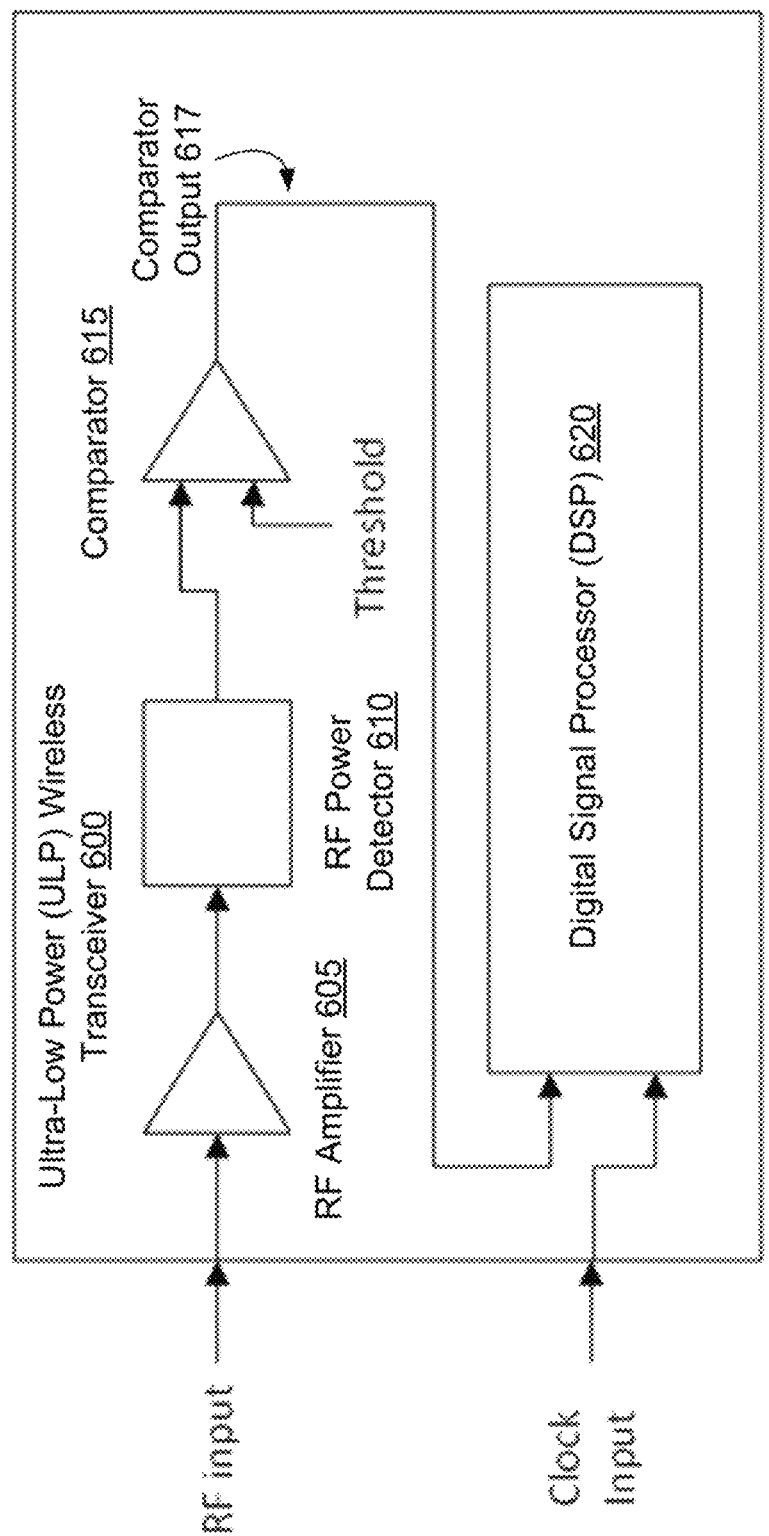
FIG. 6 is a system block diagram of an ultra-low power (ULP) wireless transceiver, according to an embodiment.

In another configuration, data can be encoded by transitioning a wireless transceiver between the "standby" and "active" states. FIG. 6 is a system block diagram of an ultra-low power (ULP) wireless transceiver, according to an embodiment. The ULP wireless transceiver 600 first amplifies at the RF amplifier 605, the wireless (RF) input signal sent from a wireless transceiver, and then measures the power level of the received wireless (RF) signal at an RF power detector 610 (e.g., a peak-detector circuit). The RF power detector 610 outputs an electric voltage that is proportional to the magnitude of the RF signal that arrived at the input terminal of the RF power detector 610. The output voltage from the RF power detector 610 is compared to a threshold voltage in an analog comparator 615. The threshold voltage can be a pre-determined voltage level that is representative of adequate communication between the two wireless transceivers discussed above. In some instances, when the received power is above the threshold value, the comparator 615 outputs a logical "1". In other instances, when the received power is below the threshold value, the comparator 615 outputs a logical "0". The output of the comparator 615 can be used for communication from a wireless communication device (e.g., a cellular phone that includes a Bluetooth®-compliant wireless transceiver) to the wireless peripheral device (that includes a ULP radio transceiver 600) in the following way.

When the wireless communication device configures its wireless transceiver in the "standby" state, no wireless data units are transmitted by the wireless communication device and the comparator output 617 on the ULP wireless transceiver 600 is a "0". When the wireless communication device configures its wireless transceiver to the "active" mode, the wireless communication device begins transmitting data units wirelessly according to the standard wireless communication protocol. The ULP wireless transceiver 600 detects the presence of the data units by measuring an increase in the RF power level, and outputs a "1". This forms the basic method for communication from the wireless communication device to the wireless peripheral device.

A message or data that is transmitted from a wireless communication device can be received at the wireless peripheral device using the ULP wireless transceiver 600 described above. A digital signal processor (DSP) 620 located after and receiving the comparator output 617 of the ULP wireless transceiver 600 can perform message decoding capable of identifying patterns in the comparator output 617. The wireless communication device begins transmitting a message by, for example, transitioning its wireless transceiver between the "active" and "standby" states at a regular interval. The DSP 620 on the ULP wireless transceiver 600 detects alternating "0" and "1" on the comparator output 617 and compares this comparator output 617 to a reference clock (not shown) on the ULP radio receiver. The ULP wireless transceiver 600 then synchronizes its local clock to the incoming bit sequence, producing a "synchronized clock" locally on the ULP wireless transceiver 600 that can later be used to demodulate the incoming wireless data units. After a predefined number of cycles alternating between "active/standby" states, the wireless communication device begins encoding data to be sent to the wireless peripheral device. At the same regular interval, the wireless communication device transitions its wireless transceiver to the "active" state when a "1" is to be transmitted, and to the "standby" state when a "0" is to be transmitted. The DSP 620 on the ULP wireless transceiver 600 then monitors the comparator output 617, and records the value of the comparator output 617 at every interval of the synchronized clock in, for example, a memory (not shown in FIG. 6). At every rising edge of the synchronized clock, either a "0" or a "1" will be sampled by the DSP 620 and recoded in the memory. The recoded message can then be decoded and output by the DSP 620 (not shown in FIG. 6). For example, in some instances, the message decoding can be based on the pulse width of the "1" sample values from the comparator output 617. Based on this output, further action can be taken by the ULP wireless transceiver 600 or the wireless peripheral device if necessary or appropriate.

The wireless communication device can communicate to the ULP wireless transceiver 600 on the wireless peripheral device by using a standard wireless communication protocol compliant transceiver without any modification to the wireless communication device hardware. Therefore, the control of the wireless transceiver (located in the wireless communication device) to encode and transmit a message to the ULP wireless transceiver 600 can be performed entirely in software on the wireless communication device (also referred to herein as "control software"). This control software can be stored in a memory of the wireless communication device (e.g., memory 210 in FIG. 2) and/or executed in a processor of the wireless communication device (e.g., processor 215 in FIG. 2). The method by which the wireless communication device controls its wireless transceiver through its control software is dependent on the wireless communication device, wireless communication device operating system, and level of control allowed by permissions settings of the wireless communication device. The control software can be written or configured specifically to control the state of the wireless transceiver, transitioning it, for example, between "active" and "standby" states at specific times. This is analogous to transitioning the wireless communication device into and out of "airplane mode," but doing so periodically and at controlled instants in time.

Figure 7:
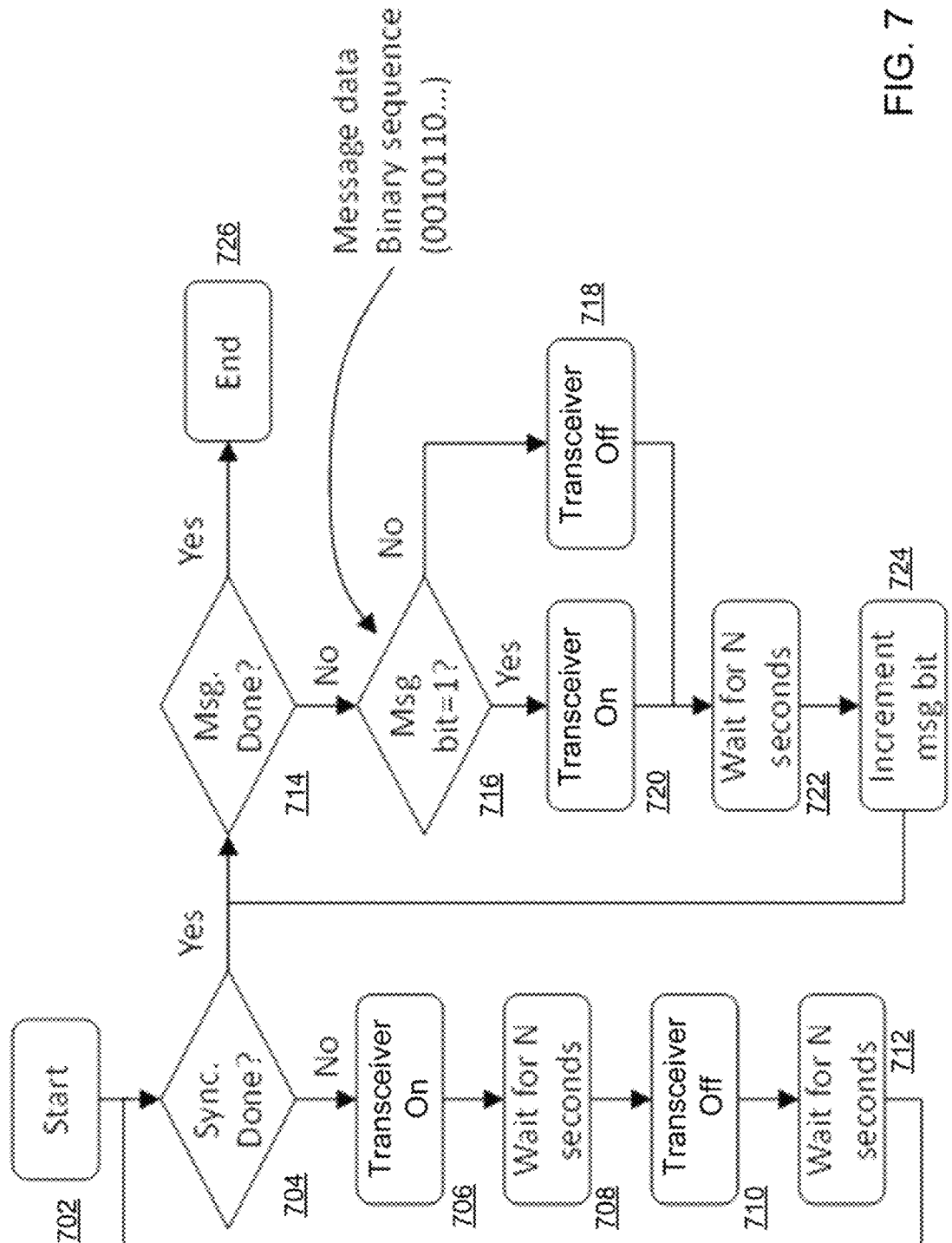
FIG. 7 is a flowchart illustrating a method by which the control software executed by a wireless communication device can communicate with an ULP wireless transceiver, according to an embodiment.

FIG. 7 is a flowchart illustrating a method by which the control software executed by a wireless communication device can communicate with an ULP wireless transceiver, according to an embodiment. The method 700 includes the control software starting a communication session with the ULP wireless transceiver, at 702. Between steps 704-712, the control software transitions the ULP wireless transceiver between on and off modes, for example, for a fixed number of cycles and at a periodic rate, to provide a synchronization sequence to which the ULP wireless transceiver can synchronize its local clock.

After provisioning the synchronization sequence, between steps 714-724, the control software begins modulating the message to be transmitted onto the on/off state of the wireless transceiver (located in a wireless communication device) at the same rate by only turning the wireless transceiver on when a "1" data bit is to be transmitted and turning the wireless transceiver off to transmit a "0" data bit. The control software continues the steps 714-724 until the entire message has been transmitted. The control software can alternatively modulate the message data by varying the transmit power level of the wireless transceiver, rather than its on/off state, which can be controlled via the control software with no required changes to the wireless communication device hardware. After the desired message has been transmitted to the ULP wireless transceiver, the control software can end the transmission of the message by bringing the wireless communication device to an "off" or a "standby" state, at 726.

Figure 8:
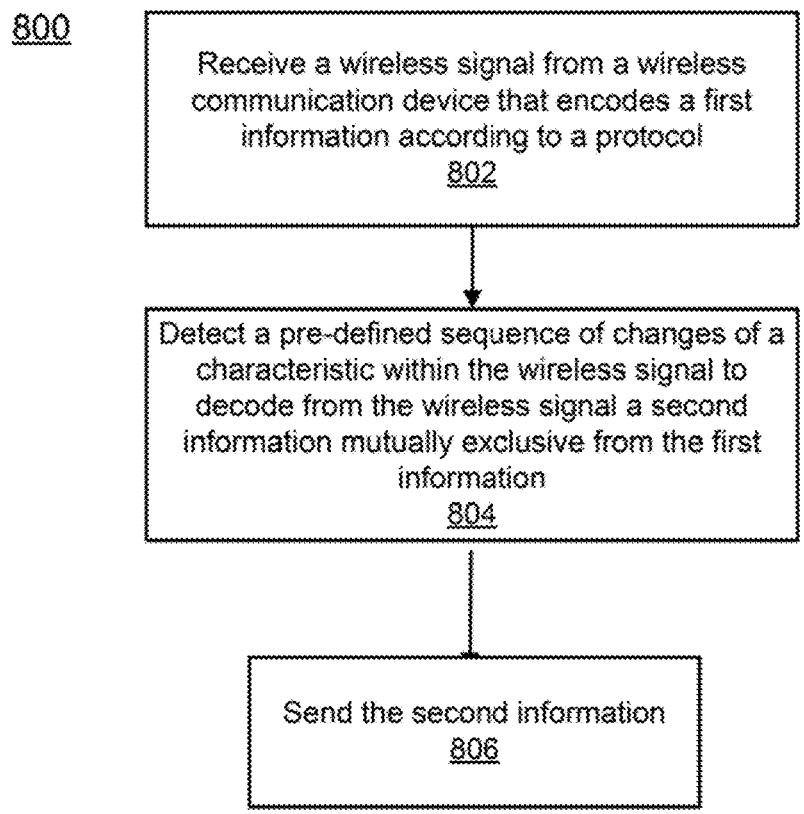
FIG. 8 is a flowchart illustrating a method by which an ULP wireless transceiver can communicate with a wireless communication device, according to an embodiment.

FIG. 8 is a flowchart illustrating a method by which a ULP wireless transceiver can communicate with a wireless communication device, according to an embodiment. The method 800 includes receiving at, for example, a wireless peripheral device that includes a wireless receiver circuit of the ULP wireless transceiver, a wireless signal from a wireless communication device, at 802. As described above, the wireless communication device can be any mobile wireless communication device such as, for example, a laptop computer, a personal digital assistant (PDA), a standard cellular phone, a smart phone, a tablet personal computer (PC), and/or so forth. The wireless communication device is separate from the wireless receiver circuit of the ULP wireless transceiver and encodes a first information according to a protocol in the wireless signal. The wireless communication device can send the wireless signal according to any standard wireless communication protocol such as, for example, wireless fidelity (Wi-Fi®) protocol, Bluetooth® 4.0 protocol, cellular protocol (e.g., third generation mobile telecommunications (3G) or fourth generation mobile telecommunications (4G) protocol), 4G long term evolution (4G LTE) protocol), Near Field Communication (NFC) protocol, and/or the like. As described above, the wireless peripheral device can be any wireless device such as, for example, a headset, a stereo, a computer mouse, an electronic pen or stylus, and/or the like. The wireless receiver circuit of the ULP wireless transceiver is not fully compliant with one or more of the standard wireless communication protocol(s) discussed above.

At 804, a pre-defined sequence of changes of a characteristic within the wireless signal can be detected by, for example, the wireless receiver circuit of the ULP wireless transceiver, to decode a second information mutually exclusive from the first information without decoding the first information. As described above, the second information can be representative of, for example, transitions between operating states of the wireless communication device (e.g., a timing sequence) that can indicate a message to the wireless peripheral device (e.g., a "wake-up" message). In such instances, the wireless receiver circuit of the ULP wireless transceiver can decode the received wireless signal to decode the second information without decoding the first information encoded in the wireless signal. At 806, the second information is sent by, for example, the wireless receiver circuit of the ULP wireless transceiver to, for example, the processor of the wireless peripheral device.

It is intended that some of the methods and apparatus described herein can be performed by software (stored in memory and executed on hardware), hardware, or a combination thereof. For example, the control software on the cell phone can be performed by such software and/or hardware. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

While various embodiments have been described above, it should be understood that they have been presented by way of example only, and not limitation. Where methods and steps described above indicate certain events occurring in certain order, the ordering of certain steps may be modified. Additionally, certain steps may be performed concurrently in a parallel process when possible, as well as performed sequentially as described above. Although various embodiments have been described as having particular features and/or combinations of components, other embodiments are possible having any combination or sub-combination of any features and/or components from any of the embodiments described herein.

For example, while many of the embodiments described herein are discussed in the context of a cell phone, other types of mobile communication devices having a commercial radio can be used such as, for example, a smart phone and a tablet with wireless communication capabilities. Similarly, while many of the embodiments described herein are discussed in the context of sending and receiving data packets, any type of data unit may be applicable including data cells and data frames, depending upon the applicable communication standard.

What is claimed is:

1. A wireless communication system comprising:
   a wireless communication device configured to encode first information onto a wireless signal according to a standard wireless communication protocol; and
   an ultra low power (ULP) wireless peripheral device comprising a ULP wireless receiver circuit configured to receive and decode the first information according to a standard wireless protocol, wherein the ULP peripheral device further comprises a processor configured to execute instructions, wherein when executed the instructions cause the processor to, detect a pre-defined sequence of changes of a characteristic within the wireless signal to decode, from the wireless signal, second information that is not related to the first information, without decoding the first information according to the standard wireless communication protocol; wherein the wireless signal is a radio frequency (RF) wireless signal;
   wherein the decoding the second information comprises, encoding the second information in transitions between states of a standard wireless protocol that supports standby and page states, comprising transitioning between standby and page states at a predefined interval, wherein the transitions between states is interpreted by the ULP as a message, comprising a "turn on" message; and
   encoding the second information by transitioning the ULP between a standby state and an active state.

2. The system of claim 1, wherein the characteristic within the wireless signal is associated with activations of the ULP wireless peripheral device, the changes of the characteristic having a specific timing sequence representing the second information.

3. The system of claim 1, wherein:
   the characteristic within the wireless signal is at least one of a time response or a frequency response of the wireless signal resulting from encoding of the first information,
   the changes in the at least one of the time response or the frequency response, representing the second information.

4. The system of claim 1, wherein:
   the characteristic within the wireless signal is at least one of a time sent for each packet within the wireless signal or a time interval between adjacent packets within the wireless signal,
   the changes in the at least one of the time sent for each packet within the wireless signal or the time interval between adjacent packets within the wireless signal, representing the second information.

5. The system of claim 1, wherein the characteristic within the wireless signal is a packet-rate modulation for packets within the wireless signal, the changes in the packet-rate modulation representing the second information.

6. The system of claim 1, wherein the characteristic within the wireless signal is a channel frequency for packets within the wireless signal, the changes in the channel frequency representing the second information.

7. The system of claim 1, wherein the wireless communication device is a cellular phone.

8. The system of claim 1, wherein the protocol is according to one of a Bluetooth® standard, a WiFi standard, or a cellular standard.

9. A wireless communication apparatus, comprising:
a wireless transceiver that complies with one or multiple standard wireless communication protocols;
a memory configured to store instructions;
a processor configured to execute the instructions, when executed the instructions cause the processor to:
encode first information according to a standard wireless communication protocol to produce a first signal;
wherein the wireless transceiver is configured to send, to an Ultra-Low Power (ULP) wireless receiver circuit of a ULP wireless peripheral device transceiver a wireless signal based on the first signal and having a predefined sequence of changes of a characteristic of the first signal that represents second information not related to the first information;
wherein sending the second information comprises,
encoding the second information in transitions between states of a standard wireless protocol that supports standby and page states, comprising transitioning between standby and page states at a predefined interval, wherein the transitions between states is interpreted by the ULP as a message, comprising a "turn on" message; and
encoding the second information by transitioning the ULP between a standby state and an active state; and
wherein, the wireless signal is a radio frequency (RF) wireless signal.

10. The apparatus of claim 9, wherein the wireless transceiver is configured to send, to the wireless receiver circuit, the wireless signal such that the wireless receiver circuit detects the changes of the characteristic within the wireless signal to decode the second information.

11. The apparatus of claim 9, wherein:
the characteristic within the wireless signal is associated with activations of the transceiver,
the wireless transceiver is configured to change its activation in a specific timing sequence to encode the second information.

12. The apparatus of claim 9, wherein:
the characteristic within the wireless signal is at least one of a time sent for each packet within the wireless signal or a time interval between adjacent packets within the wireless signal,
the wireless transceiver is configured to change the at least one of the time sent for each packet within the wireless signal or the time interval between adjacent packets within the wireless signal, to encode the second information.

13. The apparatus of claim 9, wherein:
the characteristic within the wireless signal is a packet-rate modulation for packets within the wireless signal,
the wireless transceiver is configured to change the packet-rate modulation to encode the second information.

14. The apparatus of claim 9, wherein:
the characteristic within the wireless signal is a channel frequency for packets within the wireless signal,
the wireless transceiver is configured to change the channel frequency to encode the second information.

15. The apparatus of claim 9, wherein:
the characteristic within the wireless signal is at least one of a time response or a frequency response of the wireless signal resulting from encoding of the first information,
the wireless transceiver is configured to change the at least one of the time response or the frequency response to encode the second information.

* * * * *